(12) United States Patent
Kubiak et al.

(10) Patent No.: US 11,959,418 B2
(45) Date of Patent: Apr. 16, 2024

(54) IMPELLER FOR A PLANET CARRIER OF A PLANETARY GEAR SPEED REDUCER OF A TURBOMACHINE

(71) Applicants: SAFRAN AIRCRAFT ENGINES, Paris (FR); SAFRAN TRANSMISSION SYSTEMS, Colombes (FR)

(72) Inventors: Guillaume Patrice Kubiak, Moissy-Cramayel (FR); Julien Fabien Patrick Becoulet, Moissy-Cramayel (FR); Romain Guillaume Cuvillier, Moissy-Cramayel (FR); Simon Loïc Clément Lefebvre, Moissy-Cramayel (FR); Emmanuel Pierre Dimitri Patsouris, Moissy-Cramayel (FR); Didier Jean-Louis Yvon, Moissy-Cramayel (FR)

(73) Assignees: SAFRAN AIRCRAFT ENGINES, Paris (FR); SAFRAN TRANSMISSION SYSTEMS, Colombes (FR)

(*) Notice: Subject to any disclaimer, the term of this patent is extended or adjusted under 35 U.S.C. 154(b) by 114 days.

(21) Appl. No.: 17/775,423

(22) PCT Filed: Nov. 6, 2020

(86) PCT No.: PCT/FR2020/052031
§ 371 (c)(1),
(2) Date: May 9, 2022

(87) PCT Pub. No.: WO2021/094677
PCT Pub. Date: May 20, 2021

(65) Prior Publication Data
US 2022/0372912 A1    Nov. 24, 2022

(30) Foreign Application Priority Data
Nov. 15, 2019   (FR) ..................................... 1912783

(51) Int. Cl.
*F02C 7/06* (2006.01)
*F01D 25/18* (2006.01)
(Continued)

(52) U.S. Cl.
CPC ................ *F02C 7/06* (2013.01); *F01D 25/18* (2013.01); *F02C 7/36* (2013.01); *F16H 57/046* (2013.01);
(Continued)

(58) Field of Classification Search
CPC .... F02C 7/06; F02C 7/36; F01D 25/18; F05D 2220/32; F05D 2260/98; F16H 57/046;
(Continued)

(56) References Cited

U.S. PATENT DOCUMENTS 8,911,318 B2    12/2014  Izuka
2013/0225353 A1*  8/2013  Gallet ................. F16H 57/0423
                                                  475/159
(Continued)

FOREIGN PATENT DOCUMENTS

DE    102011086376 A1 *  5/2013  ............ F16D 55/36
FR         2987416 A1      8/2013
(Continued)

OTHER PUBLICATIONS

English Translation of the International Search Report dated Feb. 3, 2021, issued in corresponding International Patent Application No. PCT/FR2020/052031 filed on Nov. 6, 2020, 4 pages.
(Continued)

*Primary Examiner* — Tinh Dang
(74) *Attorney, Agent, or Firm* — Christensen O'connor Johnson Kindness PLLC (57) ABSTRACT

An impeller (230) for a planet carrier of a planetary gear speed reducer of a turbomachine, is configured intended to be rotatably secured to the planet carrier and to be rotated
(Continued)

about an axis A of the speed reducer. The impeller has an annular shape about the axis and includes lubrication means (43, 45, 238), in particular for lubricating bearings of planet gears of the speed reducer. The lubrication means include an annular cavity (238) situated at the inner periphery of the impeller. The impeller includes an inner peripheral wall (246) closing the cavity (238) in the radial direction, and the impeller includes an annular port (248) that extends around the axis and that opens in the axial direction into the cavity in order to supply it with lubricating oil.

13 Claims, 7 Drawing Sheets

(51) Int. Cl.
   *F02C 7/36* (2006.01)
   *F16H 57/04* (2010.01)
(52) U.S. Cl.
   CPC ...... *F05D 2220/32* (2013.01); *F05D 2260/98* (2013.01)
(58) Field of Classification Search
   CPC ..... F16H 57/045–0465; F16H 57/0456; F16H 57/0427; F16H 57/0479; F16H 57/0482
   See application file for complete search history.

(56) References Cited

U.S. PATENT DOCUMENTS

| | | |
|---|---|---|
| 2013/0313053 A1 | 11/2013 | Andersson et al. |
| 2017/0356306 A1* | 12/2017 | Lao ..................... F16H 57/0421 |
| 2018/0306293 A1 | 10/2018 | Uhkoetter |
| 2019/0032514 A1 | 1/2019 | Gedin et al. |
| 2019/0085972 A1 | 3/2019 | Uhkoetter et al. |
| 2019/0301466 A1 | 10/2019 | Violet |

FOREIGN PATENT DOCUMENTS

| | | |
|---|---|---|
| FR | 3036763 A1 | 12/2016 |
| FR | 3041054 A1 | 3/2017 |
| FR | 3047279 A1 | 8/2017 |
| FR | 3065773 A1 | 11/2018 |
| WO | 2015008000 A2 | 1/2015 |
| WO | 2018185186 A1 | 10/2018 |
| WO | 2018189457 A1 | 10/2018 |

OTHER PUBLICATIONS

English Translation of the Written Opinion of the International Searching Authority dated Feb. 3, 2021, issued in corresponding International Patent Application No. PCT/FR2020/052031 filed on Nov. 6, 2020, 3 pages.

* cited by examiner

IMPELLER FOR A PLANET CARRIER OF A PLANETARY GEAR SPEED REDUCER OF A TURBOMACHINE

CROSS REFERENCES TO RELATED APPLICATIONS

This application is a National Stage of International Application No. PCT/FR2020/052031, filed Nov. 6, 2020, which claims priority to French Patent Application No. 1912783, filed Nov. 15, 2019, the entire disclosures of which are hereby incorporated by reference.

TECHNICAL FIELD

Embodiments of the present disclosure relate in particular to an impeller for a planet carrier of an epicyclic gear speed reducer of a turbomachine.

BACKGROUND

The prior art in this field comprises in particular the documents FR-A1-3 036 763, FR-A1-3 047 279, FR-A1-3 041 054, FR-A1-3 065 773, WO-A1-2015/008000, US-A1-2019/301466, US2013313053A1, US-A1-2018/306293, US-A1-2019/032514, WO-A1-2018/189457, US-B2-8 911 318 and WO-A1-2018/185186.

An epicyclic gear speed reducer of an aircraft turbomachine typically comprises a sun gear coupled to a first shaft and a ring gear extending around the sun gear. Planet gears are arranged between the sun gear and the ring gear and are meshed with them and carried by a planet carrier coupled to a second shaft.

Figure 1:
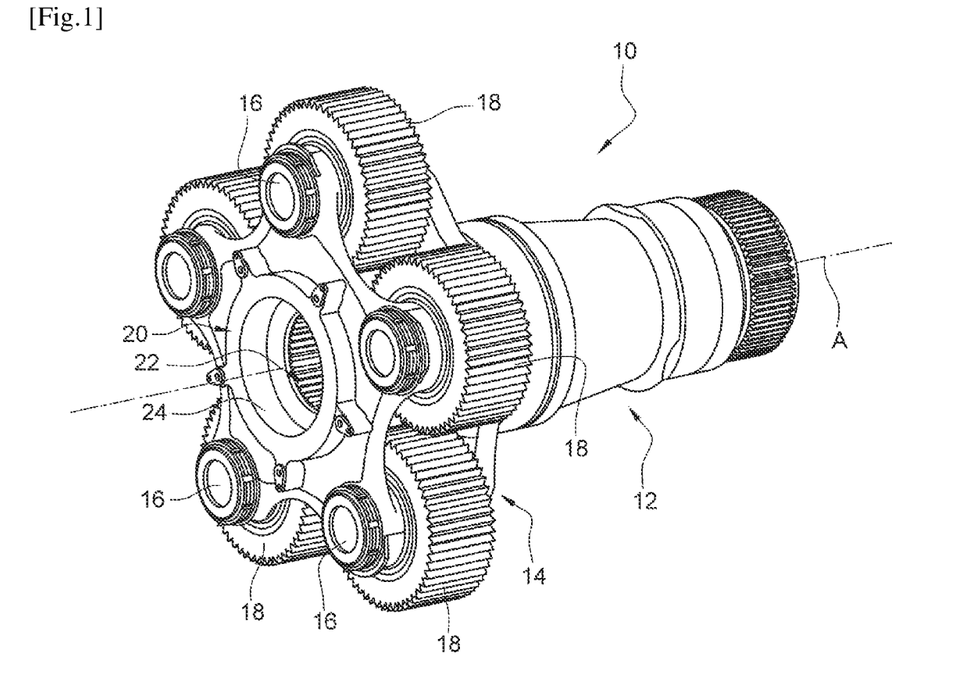
FIG. 1 is a schematic perspective view of a planet carrier of the prior art.

FIG. 1 illustrates a planet carrier 10 as described in the application FR-A1-3 036 763. This planet carrier 10 comprises a cylindrical body 12 intended to be coupled to the second shaft and connected at a longitudinal end to an annular wall 14 supporting parallel axes 16 for rotation of the planet gears 18. The axes 16 are evenly distributed around the axis A of rotation of the planet carrier and are secured with one of their longitudinal ends to the aforementioned annular wall 14. An impeller 20 is added and attached to the opposite longitudinal ends of the axes 16.

The impeller 20 is secured with the planet carrier 10 because of its connection to the support axes 16 of the planet gears 18. The impeller 20 is therefore intended to be rotated in operation about the axis A by being secured with the rotor of the reducer.

The impeller 20 has a generally annular shape about the axis A and comprises hydraulic connections at its external periphery to the axes 16 of rotation of the planet gears 18. The impeller 20 comprises means for lubricating, on the one hand, the bearings mounted between the axes 16 and the planet gears 18, and, on the other hand, meshing teeth of the planet gears 18 and the sun gear 22. These lubrication means comprise an annular gorge 24 located at the internal periphery of the impeller 20 and opening radially inwards, i.e. towards the axis A.

Lubricant sprinklers, carried by a stator of the reducer or of the turbomachine, are arranged radially inside the impeller (not shown in FIG. 1), and spray lubricant directly into the gorge 24 of the impeller, to supply the lubrication means.

The lubricant is fed to the sprinklers by a pump in a lubrication unit of the turbomachine, which delivers a predetermined flow rate of lubricant to the sprinklers. With the current technology described above, the lubricant sprayed into the gorge is conveyed to the lubrication means by centrifugal effect only.

The impeller therefore distributes oil under pressure in the reducer using centrifugal forces generated during operation.

However, the oil pressure in the impeller depends on the height of the oil column and on the speed of rotation of the impeller. One solution to increase the oil pressure is to increase the height of the oil column by decreasing the inner diameter of the impeller. However, the interior of the impeller is clogged by the lubricant sprinklers in the gorge of the impeller. On the other hand, these lubricant sprinklers are bulky and may come into contact with the first shaft meshed with the sun gear of the reducer.

The present disclosure provides an improvement to this technology, which provides a simple, effective and economical solution to the problem of lubricating an epicyclic gear reducer.

SUMMARY

In accordance with the disclosure, this is achieved with an assembly for an aircraft turbomachine, comprising:
an epicyclic gear speed reducer, and
at least one oil sprinkler configured to spray an oil jet oriented in a direction comprising at least one component parallel to a longitudinal axis of the turbomachine, the reducer comprising a planet carrier equipped with an impeller which is impeller for a planet carrier of a turbomachine epicyclic gear speed reducer, the impeller being intended to be secured in rotation with the planet carrier and to be rotated about an axis A of the reducer, the impeller having an annular shape about the axis and comprising means for lubricating, in particular planet gears bearings of the reducer, the lubrication means comprising an annular cavity located at the internal periphery of the impeller, the impeller comprising an internal peripheral wall for closing off the cavity in the radial direction, and the impeller comprising an annular port which extends around the axis and which opens out in the axial direction into the cavity for the purpose of being supplied with lubricating oil by the oil jet which is intended to pass through this port,
wherein the cavity is axially delimited by two annular side walls, a first of these walls being connected at its internal periphery to the closure wall, and the second of these walls comprising the port or having its internal periphery which is radially spaced from the closure wall in order to define the port, and in that the cavity comprises oil guiding fins, which are configured to guide the oil and limit its disturbance depending on the direction of rotation of the impeller.

The disclosure thus proposes a centrifugal impeller with axial injection, i.e. oil is fed into the cavity of the impeller by spraying this oil in the axial direction through the port of the impeller. This oil goes into the cavity of the impeller and is then centrifuged to feed the lubrication means. This eliminates the need for a sprinkler or other inside the impeller, which avoids cluttering up the interior of the impeller and limits the risk of interaction with the shaft that is coupled to the sun gear of the reducer.

The assembly according to the disclosure may comprise one or more of the following characteristics, taken alone from each other, or in combination with each other:
the cavity comprises an internal annular surface having a curved shape in cross-section, a concavity of which is located inside the cavity and located axially opposite the port; this surface may be complex; it preferably redirects the oil radially;

the annular surface is located at the junction between the first wall and the closure wall;

the fins are located at least on the annular surface;

the lubrication means comprise predominantly radial oil pipelines opening into the cavity; preferably, the radially internal ends of these pipelines open into the cavity;

at least some of the pipelines comprise radial ends that are configured to be in fluidic communication with internal bearing lubrication cavities; preferably, the radially external ends of these pipelines open into the cavity;

the pipelines are evenly distributed about the axis;

at least some of the pipelines are in fluidic communication with first longitudinal ends of lubricant sprinklers, which are cantilevered to the external periphery of the impeller;

the impeller comprises substantially radial arms comprising or carrying at their ends, preferably radially external, means for supporting the axles of the planet gears, at least some of the pipelines being formed in these arms;

the fins each have a generally curved shape;

each of the fins comprises a radially internal end oriented tangentially with respect to a circumference centred on the axis, and a radially external end oriented radially with respect to that axis;

the oil jet can be inclined with respect to the aforementioned axis; and the at least one sprinkler may have a radially internal end that is located on a circumference having a diameter greater than an internal diameter of the impeller, the direction of the oil jet also comprising a radial component so that this direction is inclined with respect to the longitudinal axis.

The present disclosure also relates to an aircraft turbomachine comprising an assembly as described above.

DESCRIPTION OF THE DRAWINGS

Further characteristics and advantages will be apparent from the following description of a non-limiting embodiment of the disclosure with reference to the appended drawings in which.

DETAILED DESCRIPTION

FIG. 1 shows a turbomachine 100 that conventionally comprises a fan propeller S, a low-pressure compressor 101a, a high-pressure compressor 101b, a high-pressure turbine 101d, a low-pressure turbine 101e and an exhaust nozzle 101h. The high-pressure compressor 101b and the high-pressure turbine 101d are connected by a high-pressure shaft 102 and together form a high-pressure (HP) body. The low-pressure compressor 101a and the low-pressure turbine 101e are connected by a low-pressure shaft 103 and together form a low-pressure (LP) body.

The fan propeller S is driven by a fan shaft 104 which is coupled to the LP shaft 103 by means of an epicyclic gear reducer 110 shown here schematically.

The reducer 110 is positioned in the upstream portion of the turbomachine. In this application, the terms "upstream" and "downstream" refer to the flow of the gases through the turbomachine.

A stationary structure comprising schematically, here, an upstream portion 105a and a downstream portion 105b is arranged so as to form an enclosure E1 surrounding the reducer 110. This enclosure E1 is here closed upstream by seals at the level of a bearing 106a allowing the passage of the fan shaft 104, and downstream by seals at the level of the passage 106b of the LP shaft 103.

Figure 2:
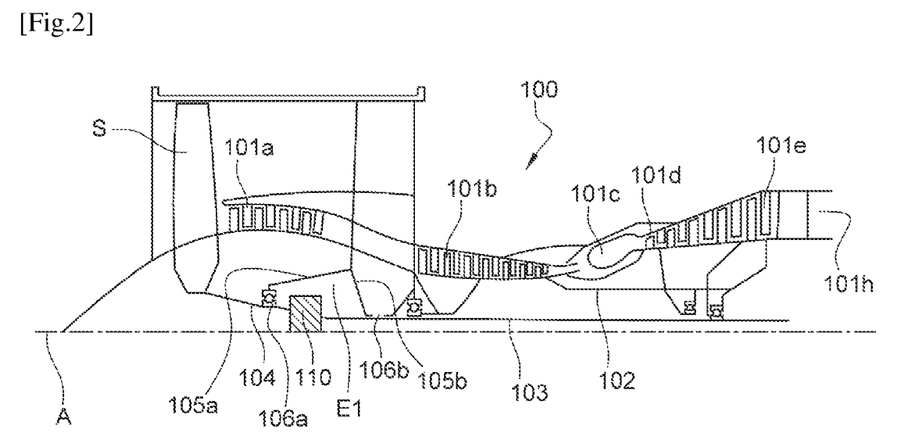
FIG. 2 schematically represents an axial cross-section of a turbomachine using the disclosure.
Figure 3:
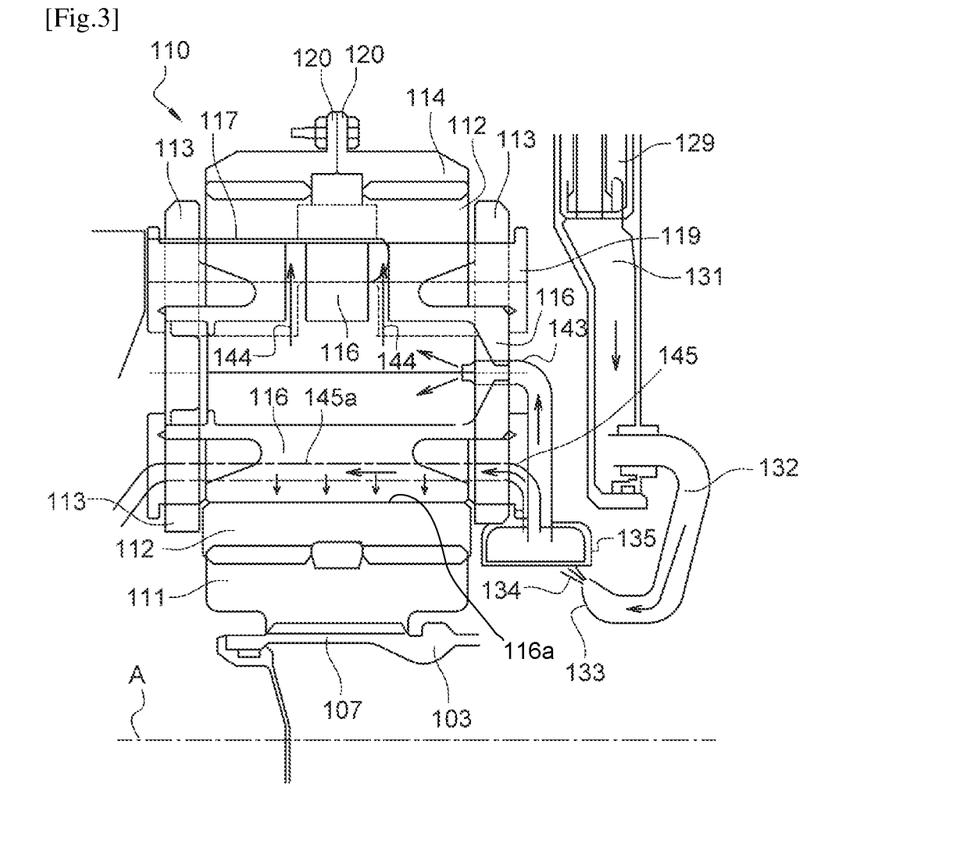
FIG. 3 shows a detailed cross-sectional view of an epicyclic gear reducer.

With reference to FIGS. 2 and 3, the reducer is enclosed in a ring gear 114 which is attached by means of a support casing 120 to the stationary structure 105a, 105b with flexible means arranged to allow it to follow the possible movements of the fan shaft 104, in certain degraded operating cases for example. These attachment means are known to the person skilled in the art and are not detailed here. A brief description can be found for example in the document FR-A1-2 987 416.

The reducer 110 of the example under consideration engages on the one hand with the LP shaft 103 by means of splines 107 which drive a planetary meshing sprocket 111, and on the other hand with the fan shaft 104 which is attached to a planet carrier 113. Classically, the planetary sprocket 111, whose axis of rotation A is coincident with that of the turbomachine, drives a series of sprockets of planet gears 112, which are evenly distributed around the circumference of the reducer 110. The number of planet gears 112 is generally defined between three and six. The sprockets of planet gears 112 also rotate about the axis A of the turbomachine, meshing with internal teeth of the ring gear 114, which is mounted stationary with respect to the turbomachine, by means of the support casing 120. Each of the planet gears 112 rotates freely about a planet gear axle 116 connected to the planet carrier 113, using a planet gear bearing 116a that may be plain, as shown in FIG. 3, or a rolling-element bearing (ball or roller bearings).

The rotation of the planet gears 112 about their planet gear axle 116, due to the cooperation of their sprockets with the teeth of the ring gear 114, causes the rotation of the planet carrier 113 about the axis A, and consequently that of the fan shaft 104 linked to it, at a speed of rotation which is lower than that of the LP shaft 103.

The drive of the fan shaft 104 through the planet carrier 113 is provided by a series of centring fingers 117, evenly distributed around the circumference of the reducer 110, which extend axially from the downstream end of the fan shaft 104 and extend into bores provided in the planet carrier 113. The planet carrier 113 extends symmetrically on either side of the axles 116 of planet gear and forms an enclosure in which a function of lubricating the gears can be implemented. Closing sockets 119, at the ends of the planet gear axles 116, allow to close this enclosure at the level of the bearings of the planet gears 112.

Figure 4:
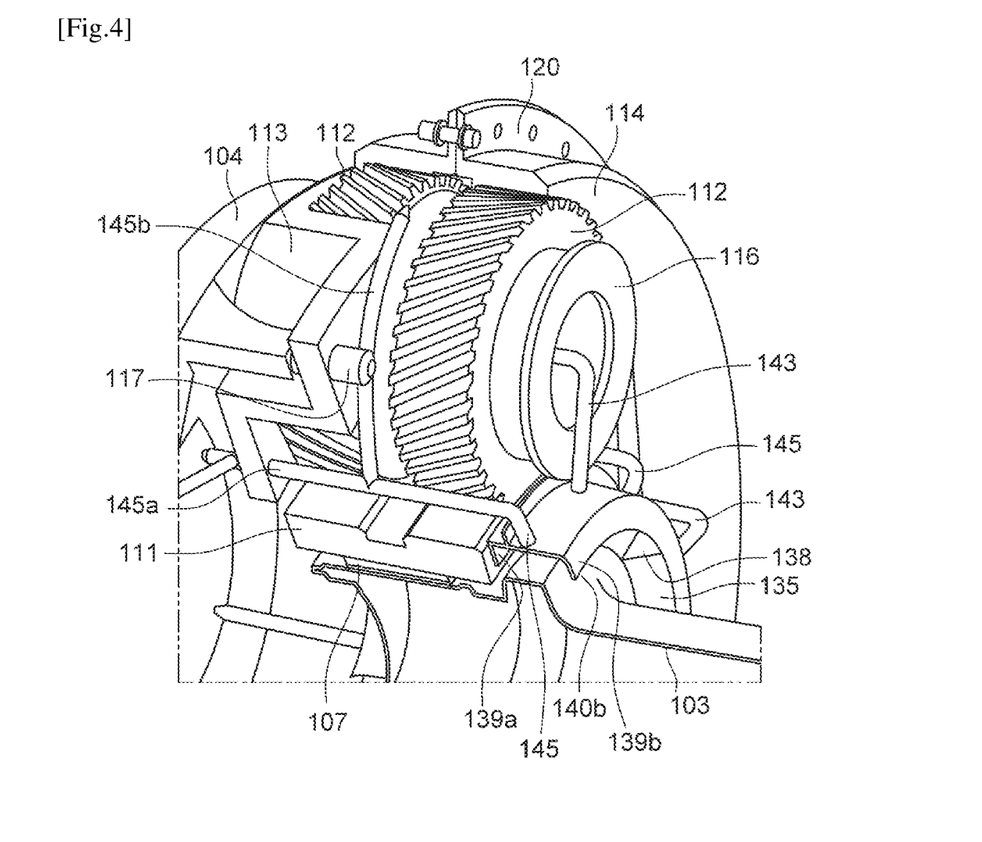
FIG. 4 is an exploded perspective view of the reducer in FIG. 3.

FIG. 3 shows, along with FIG. 4, the conveying of the oil towards and through the reducer 110. Arrows show in FIG. 3 the path followed by the oil from, in this example, a buffer reservoir 131 linked to the stationary structure of the turbomachine, to the sprockets and to the bearings to be lubricated. The lubrication device comprises schematically three portions which will be described below in succession, a first portion linked to the stationary structure and delivering the oil towards the rotating portions of the reducer 110, an impeller rotating with the planet carrier 113 receiving this oil, and oil distribution circuits supplied with oil by the impeller to convey it towards the places to be lubricated.

The first portion comprises at least one injector 132 whose calibrated end is constricted to form a sprinkler 133. The oil is fed towards the injector through a conveying pipeline 129 from the reservoir of the engine (not shown). A buffer reservoir 131 may be interposed next to the reducer 110 on the pipeline, preferably at top portion so that the oil can flow towards the centre of the reducer by gravity. The sprinkler 133 ejects the oil in the form of a jet 134, which is formed under the pressure produced jointly by the supply pump (not shown) and by the weight of the oil column located above it. The sprinkler 133 is positioned here radially inside the planet carrier 113 with respect to the axis A, and the jet 134 is oriented with a radial component directed outward from the reducer 110.

Figure 5:
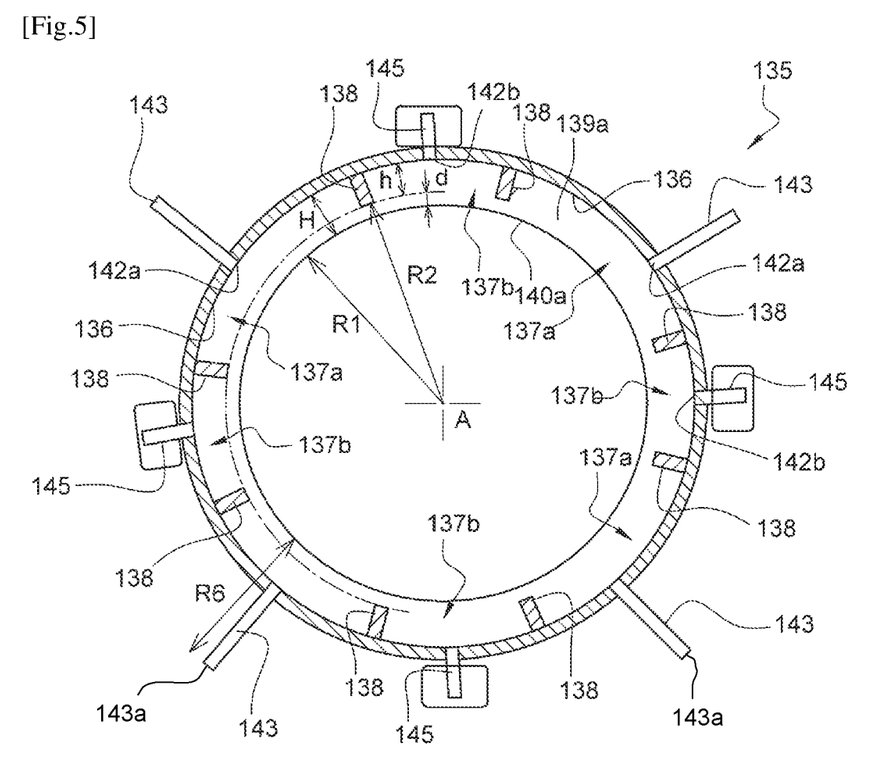
FIG. 5 shows a schematic cross-section of an impeller of the reducer of FIG. 3.

With reference to FIGS. 4 and 5, the oil receiving impeller 130 connected to the planet carrier 113 essentially comprises a cylindrical cup 135, here with a radial U-shaped cross-section, the U-shaped opening of which is oriented in the direction of the axis of rotation A. The impeller 130 is arranged on the planet carrier 113 so that the bottom 136 of the U of the cup 135 collects the oil jet 134 ejected by the sprinkler 133.

According to the disclosure, the cup 135 of the impeller 130 is here divided into a circumferential succession of troughs 137a, 137b separated by radially oriented walls 138 extending axially between the two side walls 139a, 139b of the U formed by the cup 135. In the example shown, the circumferential dividing walls 138 delimit two alternating series of four troughs 137a, 137b, with a same circumferential extension in one series but different from one series to the next.

Centrifugally, as the impeller 130 rotates with the planet carrier 113, the oil received on the bottom 136 of the cup 135 is driven in rotation and pressurized between the bottom 136 and the side walls 139a, 139b of the cup 135. Each trough 137a, 137b, as it passes successively in front of the sprinkler 133 during the rotation, collects an amount of oil proportional to its circumferential extension. In effect, the radially inner edges of the walls 139a-139b-138 of a trough 137a, 137b define an entrance surface to the trough along the radial direction. This oil remains confined between the walls 138, 139a, 139b of the trough 137a, 137b as long as the oil level relative to the bottom 136 remains below the minimum height h of the walls 138 thereof relative to the bottom 136.

The internal radial edges 140a, 140b of the side walls 139a, 139b are substantially circular. Their radius R1 defines a general depth H of the cup 135 relative to the bottom 136. Preferably, the circumferential dividing walls 138 have an internal radial edge 141 located at a distance R2 from the axis A slightly greater than the radius R1 of the internal edges 140a, 140b of the side walls 139a, 139b. The height h of the circumferential dividing walls 138 in relation to the bottom 136 of the troughs 137a, 137b is therefore slightly less than the height H of the side walls 139a, 139b in relation to this same bottom 136.

In addition, the bottom 136 of each trough 137a, 137b comprises an opening 142a, 142b that communicates with a pipeline 143, 145 of an oil distribution circuit installed on the planet carrier 113.

With reference to FIGS. 4 and 5, the oil distribution circuits are of two types here. A first series of oil distribution circuits corresponds to first pipelines 143, which are evenly distributed around the circumference of the reducer 110 and in equal number to that of the planet gears 112. These pipelines 143 extend radially from the opening 142a in the bottom of the first series of troughs 137a and penetrate into the internal enclosure of each planet gear shaft 116, which is closed off by the planet carrier 113. The oil flowing through the first pipelines 143 penetrates the internal cavity of each planet gear axle 116 and then passes, due to centrifugal force, into guide channels 144, which pass through these planet gear axles 116 in a radially oriented manner. These channels 144 open out at the periphery of the planet gear axles 116, at the level of the bearings supporting the sprockets of the planet gears 112 and thus ensure the lubrication of these bearings (FIG. 3).

The second series of oil distribution circuits comprises second pipelines 145 that convey, from the openings 142b in the bottom of the troughs 137b of the second series of troughs between the planet gears 112 and divide into several channels 145a, 145b. The channels 145a, 145b convey the oil towards the gears formed by the sprockets of the planet gears 112 and the planetary sprocket 111, on the one hand, and the sprockets of the planet gears 112 and the external ring gear 114, on the other. Each channel 145a extends axially along the sprockets of a planet gear 112, between them and the planetary 111, and forms a lubrication ramp across the entire width of the sprockets. The channel 145b, which supplies the gear between the ring gear 114 and the sprockets of the planet gears 112, sprays its oil into the centre of the cylinder formed by each planet gear 112. As shown, each planet gear 112 is made as two parallel sprockets. Their toothing are oriented diagonally with respect to the axis of rotation of the planet gear 112, so that they give a function as grooves in which the oil is driven from the middle of the cylinder to its periphery to lubricate the gear over its entire width.

In this example, the first oil distribution circuits 143-144 that lubricate the bearings supporting the planet gears need to convey a greater flow rate of oil than the second circuits 145-145a-145b. For this reason, the circumferential extension of the troughs 137a of the first series, which correspond to them, is greater than that of the troughs 137b of the second series. Here, a ratio of two-thirds to one-third is sought in the oil flow rate during nominal operation; the circumferential extension of the two series of troughs 137a, 137b substantially duplicates this ratio.

The assembly has been presented here with reference to an architecture of reducer 110 with four planet gears 112 with two series of oil distribution circuits 143-144, 145-145a-145b of different types. For other reducer architectures, the number of troughs per series may be different. Also, the number of series of troughs with similar circumferential extensions can be different, depending on the types of oil distribution circuits. For example, the second oil distribution circuits could be subdivided into two, one dedicated to the gearing of the sprockets of the planet gears 112 with the planetary 111 and the other dedicated to the gearing with the ring gear 114. In this case, a variant of the oil recovery impeller can be realized with three series of troughs of different circumferential extensions.

Figure 6:
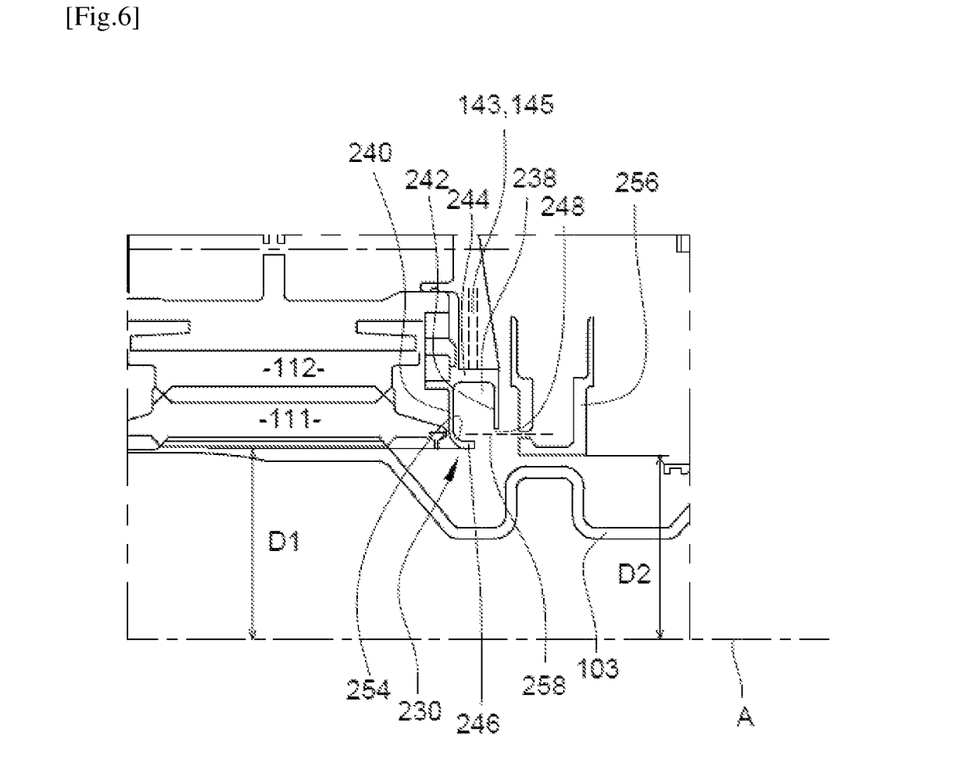
FIG. 6 is a partial schematic perspective view in axial cross-section of an impeller according to an embodiment of the disclosure.
Figure 7:
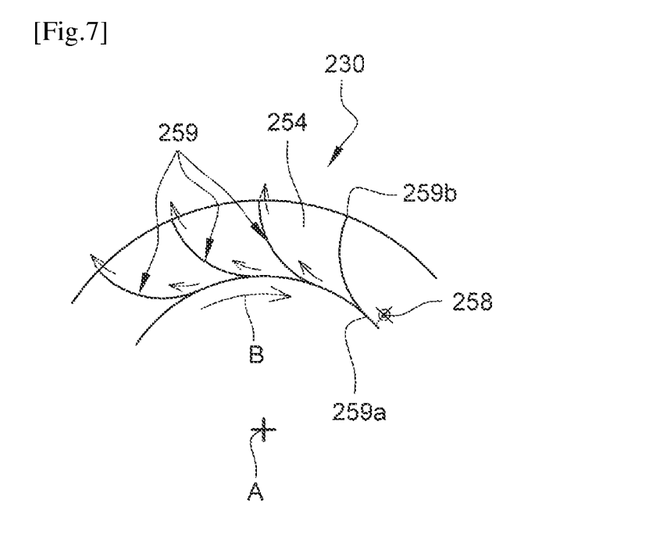
FIG. 7 is a very schematic, larger scale view of a portion of an internal annular guide surface of the impeller of FIG. 6.

FIGS. 6 and 7 illustrate a first embodiment of an impeller 230 according to the disclosure.

The impeller 230 comprises characteristics described in the foregoing and which are designated by the same references in FIGS. 3 to 5. It comprises in particular pipelines 143 and pipelines 145

The impeller 230 has a generally annular shape about the aforementioned axis A. In the example shown, the impeller 230 may be formed in one piece or result from the assembly of at least two parts.

The impeller 230 may comprise means for supporting the rotation axles 116 of the planet gears of the reducer. The impeller 230 may also comprise means for lubricating the toothing of the planet gears and the bearings of the axles 116, which comprise in particular the aforementioned pipelines 143, 145.

The lubrication means comprise an annular cavity 238 located at the internal periphery of the impeller 230 and connected to the pipelines 143, 145. The pipelines 143 extend substantially radially between the cavity 238 and the axles 116 for their oil supply. The pipelines 145 extend substantially radially between the cavity 238 and sprinkler mounting orifices or channels 145a, 145b such as those described in the foregoing in connection with FIGS. 3 to 5.

The annular cavity 238 is delimited by two annular side walls 240, 242, an external peripheral bottom wall 244, and an internal peripheral closure wall 246.

The walls 240, 242 extend radially between the walls 244, 246. The radially internal ends of the pipelines 143, 145 open onto the wall 244.

The wall 246 is between 30% and 100% of the distance between the walls 240 and 242. It may or may not be aligned with the downstream surface of the annular cavity.

The function of the wall 246 is to prevent oil from exiting the cavity 238; in this sense, it may be in the form of a radial bead or rim.

In contrast to prior art where the supply to the impeller 130 is centrifugal, the cavity 238 of the impeller 230 is at least partly closed radially inward by the wall 246 which extends axially between the walls 240, 242. The wall 246 is connected to the wall 240 and extends radially inwardly from the wall 242, radially spaced therefrom. The internal periphery of the wall 242 and the wall 246 thus define between them an annular lubricating oil supply port 248 of the cavity 238.

The cavity 238 comprises an internal annular surface 254 that is located opposite the port 248. This surface 254 is located at the junction between the walls 240, 246. In axial cross-section, this surface 254 has a curved shape with a concavity located inside the cavity and facing the port 248. There could be a radial rim between the surface 254 and the wall 246, allowing oil to flow back into the cavity 238.

The surface 254 may have an axial dimension of between 30 and 60% of the axial dimension of the wall 246. The surface 254 may have a radial dimension between 20 and 50% of the radial dimension of the wall 240. Furthermore, the port 248 has a radial dimension between 2 and 20% of the radial dimension of the wall 242 or of the cavity 238, and/or between 5 and 20% of the radial dimension of the surface 254.

The dotted lines in FIGS. 6 and 7 illustrate an oil jet 258 projected from a sprinkler 256 attached to a stator of the turbomachine.

The oil jet 258 is directed parallel to the axis A and through the port 248. This oil jet 258 impacts the surface 254, which preferably comprises projecting fins 259 (FIG. 7).

The fins 259 are configured to guide the oil and limit its disturbance as a function of the direction B of rotation of the impeller 230 about the axis A. As in the example shown, they may thus be curved and each comprise, for example, a radially internal end 259a oriented tangentially with respect to a circumference centred on the axis A, and a radially external end 259b oriented radially with respect to this axis A.

The fins 259 may be located on a wall attached to a wall of the cavity 238. With respect to the wall 240, for example, the wall of the fins may extend in an axial and radial direction.

The fins preferably have the function of guiding the oil from its axial direction of impact to a radial direction and also to improve the pressure with centrifugal effect to promote the oil rise.

The fins can have a bladed profile. The cross-section between two fins at the arrival of the axial jet can be larger than the cross-section at the head.

The fins can have a variable inclination from a transverse direction to a radial direction away from the axis in a plane normal to the axis (see FIG. 7).

The height of the fin can be variable, and can for example decrease from the impact point to the outlet point of the oil.

Alternatively, the fin may be free or attached to the wall 242. If attached, the fin may protrude from this wall, particularly radially inward.

The fins can be fitted welded on or made by additive manufacturing.

In the embodiment shown in FIG. 6, the impeller has an internal diameter D1 substantially equal to the diameter D2 of a circumference centred on the axis A and passing through the radially internal end of the sprinkler 256, which is here oriented substantially radially.

Optionally, D2 could be lower than D1 (of the order of 10% for example) so that the sprinkler does not constrain the integration with respect to the impeller.

Figure 8:
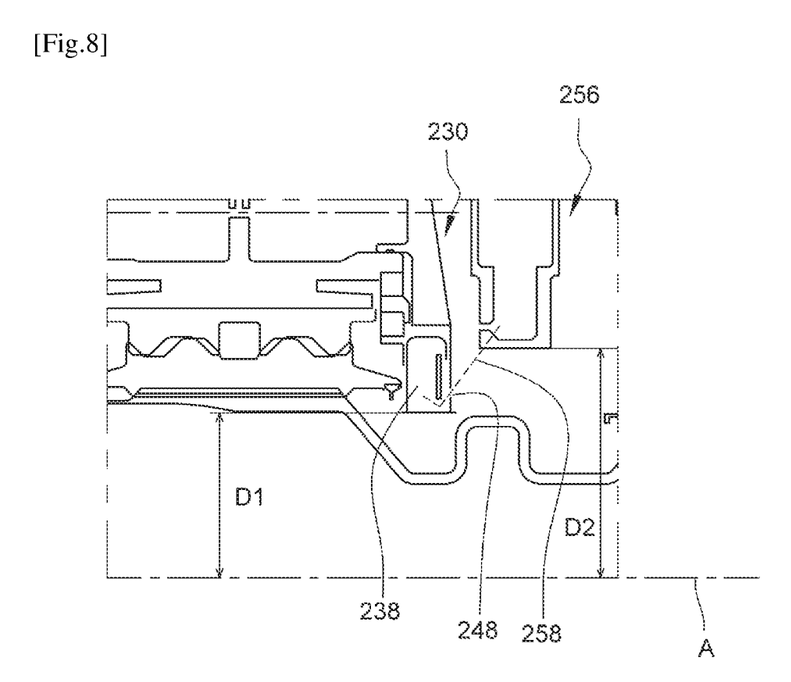
FIG. 8 is a partial schematic perspective view in axial cross-section of an impeller according to an alternative embodiment of the disclosure.

FIG. 8 illustrates an alternative embodiment of the impeller 230 in which the sprinkler 256 has a radially internal end that is located on a circumference with a diameter D2 that is greater than the internal diameter D1 of the impeller 230.

The oil jet 258 is inclined with respect to the axis A, in a direction that comprises an axial component and also a radial component. In the example shown, the sprinkler 256 is located downstream of the impeller 230 and the oil jet 258 is inclined downstream to upstream towards the axis A.

In general, a reducer impeller distributes oil to the reducer using the centrifugal forces generated by the planet carrier that carries the impeller. The oil pressure in the impeller depends on the height or radial dimension of the oil column available in the impeller and the speed of rotation of the impeller and of the planet carrier. Here, the height of the oil column is increased by decreasing the internal diameter of the impeller, which is not limited by the presence of the sprinkler 256. In the example shown, the oil column of the impeller has a radial height or dimension R5 that is significantly greater than the oil column height R6 of the prior art (FIGS. 5 and 6). The dimension R5 is here measured between the wall 246 and the radially external ends 143a of the pipelines 143.

The oil injected axially into the cavity 238 is deflected radially outward by the surface 254, which serves as deflector.

In the case where the impeller is made of a single part, it could be made by additive manufacturing. In the aforementioned case where the wall 242 would be fitted and attached, this wall 242 could be welded to the rest of the impeller.

The benefits of the axially lubricated impeller are in particular:

- a reduced radial overall dimension of the technology,
- an increase of the oil pressure in the impeller (about +10% increase at take-off, i.e. at the maximum speed of the impeller, in a particular embodiment of this impeller), and
- a better oil pick-up at low misalignment (possibility of reducing the flow rate and the quantity of oil required by the impeller); once retracted, the oil can be trapped thanks to the small radial dimension of the port 248 which is located at the internal periphery of the impeller.

The invention claimed is:

1. An assembly for an aircraft turbomachine, comprising: an epicyclic gear speed reducer; and
at least one oil sprinkler configured to spray an oil jet oriented in a direction comprising at least one component parallel to a longitudinal axis of the turbomachine, wherein the epicyclic gear speed reducer comprises a planet carrier equipped with an impeller configured to be secured in rotation with the planet carrier and to be rotated about said longitudinal axis, the impeller having an annular shape about the longitudinal axis and comprising lubrication means for lubricating planet gears bearings of the epicyclic gear speed reducer, the lubrication means comprising an annular cavity located at an internal periphery of the impeller, the impeller comprising an internal peripheral wall for closing off the annular cavity in a radial direction, the impeller comprising an annular port which extends around the longitudinal axis and which opens out in an axial direction into the annular cavity for the purpose of being supplied with lubricating oil by the oil jet which is configured to pass through the annular port, wherein the annular cavity is axially delimited by two annular side walls, a first of the two annular side walls being connected at an internal periphery thereof to the internal peripheral wall of the impeller and the second of the two annular side walls comprising the annular port or having an internal periphery thereof radially spaced from the internal peripheral wall in order to define the annular port, wherein the annular cavity comprises oil guiding fins configured to guide the lubricating oil and limit disturbance of the lubricating oil depending on a direction of rotation of the impeller.

2. The assembly according to claim 1, wherein the annular cavity comprises an internal annular surface having a curved shape in cross-section, wherein a concavity of the internal annular surface is located inside the annular cavity and located axially opposite the annular port, the internal annular surface being intended to be impacted by the oil jet.

3. The assembly of claim 2, wherein the internal annular surface is located at a junction between the first of the two annular side walls and the internal peripheral wall.

4. The assembly of claim 2, wherein the oil guiding fins are located at least on the internal annular surface.

5. The assembly according to claim 1, wherein the lubrication means comprise predominantly radial oil pipelines opening into the annular cavity.

6. The assembly of claim 5, wherein at least some of the radial oil pipelines comprise radial ends configured to be in fluidic communication with internal bearing lubrication cavities.

7. The assembly according to claim 5, wherein the radial oil pipelines are evenly distributed about the longitudinal axis.

8. The assembly of claim 5, wherein at least some of the radial oil pipelines are in fluidic communication with first longitudinal ends of lubricant sprinklers, which are cantilevered to an external periphery of the impeller.

9. The assembly according to claim 5, wherein the impeller comprises substantially radial arms comprising or carrying at ends thereof means for supporting axles of the planet gears, at least some of the radial oil pipelines being formed in the radial arms.

10. The assembly of claim 1, wherein the oil guiding fins each have a generally curved shape.

11. The assembly according to claim 10, wherein each of the oil guiding fins comprises a radially internal end oriented tangentially with respect to a circumference centered on the longitudinal axis, and a radially external end oriented radially with respect to the longitudinal axis.

12. The assembly according to claim 1, wherein the at least one oil sprinkler has a radially internal end that is located on a circumference having a diameter greater than an internal diameter of the impeller, the direction of the oil jet also comprising a radial component so that the direction of the oil jet is inclined with respect to the longitudinal axis.

13. An aircraft turbomachine comprising the assembly according to claim 1.

* * * * *